M. C. PLUMMER.
SEED OR FERTILIZER DISTRIBUTER.
APPLICATION FILED DEC. 3, 1917.
1,263,105.
Patented Apr. 16, 1918.
2 SHEETS—SHEET 1.
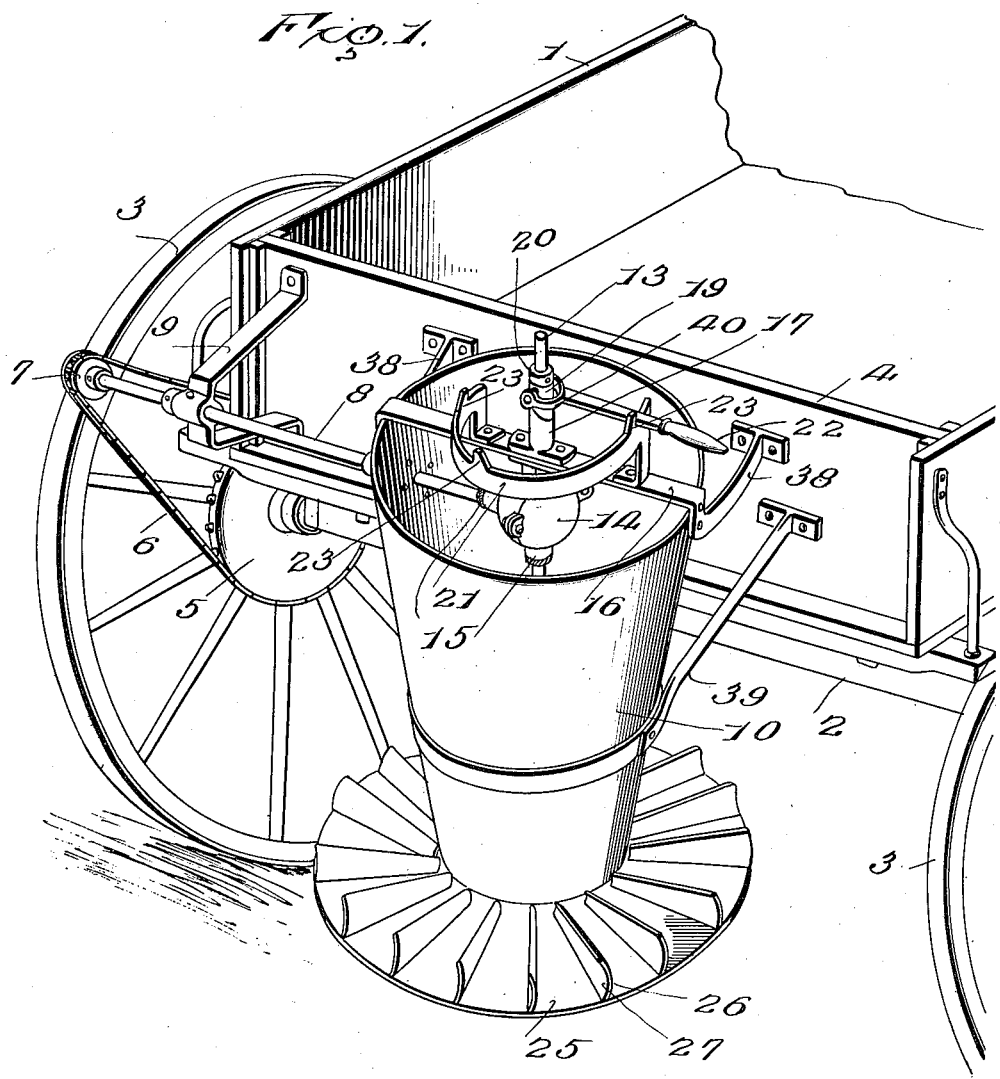
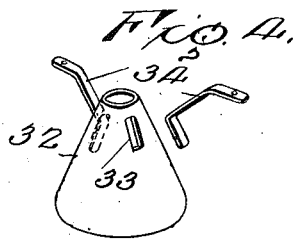
Inventor
M. C. Plummer.
By
Attorneys.

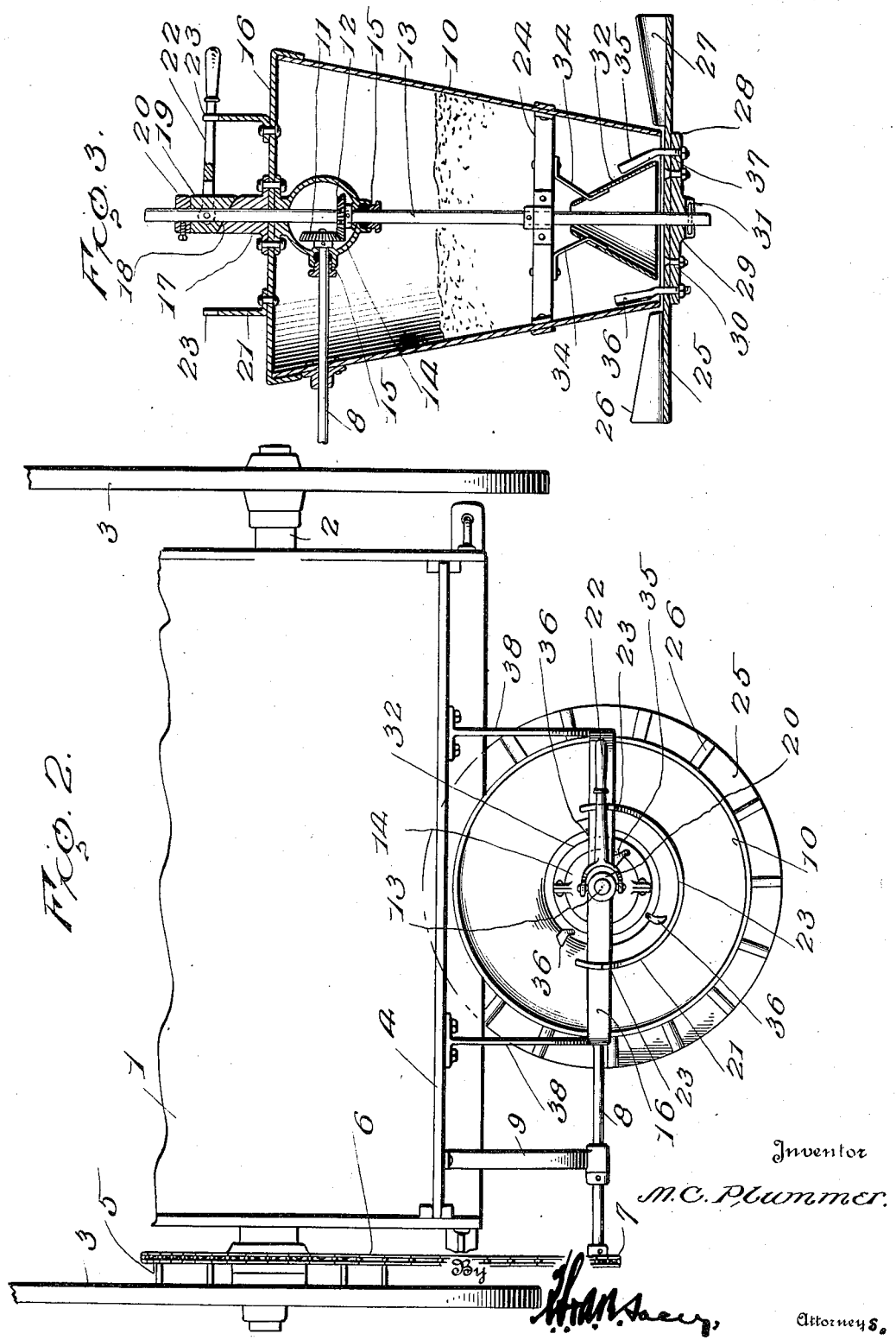

UNITED STATES PATENT OFFICE.

MICAJAH C. PLUMMER, OF WAVERLY, VIRGINIA.

SEED OR FERTILIZER DISTRIBUTER.

1,263,105.  Specification of Letters Patent.  Patented Apr. 16, 1918.

Application filed December 3, 1917. Serial No. 205,067.

*To all whom it may concern:*

Be it known that I, MICAJAH C. PLUMMER, a citizen of the United States, residing at Waverly, in the county of Sussex and State of Virginia, have invented certain new and useful Improvements in Seed or Fertilizer Distributers, of which the following is a specification.

My invention relates to seed and fertilizer distributers and one object of the same is to provide a simple and efficient mechanism which may be readily supported at the rear end of an ordinary farm wagon or other vehicle and operatively connected to one of the ground wheels so that as the vehicle is drawn over the field seed or fertilizer will be distributed. Another object of the invention is to provide a novel construction of the distributing members, and a still further object of the invention is to provide means whereby the mouth or discharge end of the hopper may be kept cleared.

The invention is illustrated in the accompanying drawings in which—

Figure 1 is a perspective view showing my improved distributer supported at the rear end of a wagon;

Fig. 2 is a plan view of the same;

Fig. 3 is a vertical section;

Fig. 4 is a detail perspective view of the deflecting cone and the brackets for supporting the same.

The wagon body 1 may be of any preferred construction and is equipped with the usual axle 2 and ground wheels 3. In carrying out my invention, I employ a supplemental end gate 4 which is intended to be substituted for the end gate ordinarily employed in the ordinary uses of the wagon. A sprocket wheel 5 is connected to one of the ground wheels 3 so as to rotate therewith and this sprocket wheel is connected by a chain 6 with a sprocket pinion 7 on the end of a driving shaft 8 which is journaled in a bracket 9 carried by the end gate. The said driving shaft 8 extends through one side of a hopper 10 and is journaled therein, the end of the shaft within the hopper being equipped with a beveled pinion 11 meshing with a similar pinion 12 splined upon the distributer shaft 13. A gear casing 14 is supported within the upper end of the hopper and entirely incloses the pinions 11 and 12 so as to permit said pinions to work within lubricant, and packing boxes 15 are provided upon the gear casing to prevent loss of lubricant around the respective shafts. This gear casing is supported by a cross bar 16 which extends over the upper end of the hopper and has the casing secured to its under side. The said cross bar is provided with an opening to accommodate the upper portion of the distributer shaft and a pedestal 17 is secured upon the upper side of the cross bar around the said shaft, the upper extremity of the said pedestal being beveled or inclined, as shown clearly at 18 in Fig. 3, so as to coact with the correspondingly beveled end of a hub or sleeve 19 which is fitted rotatably about the upper portion of the distributer shaft and rests upon the pedestal. A stop collar 20 is secured to the distributer shaft above the said sleeve 19 and rests directly on the upper end of the sleeve so that any vertical movement imparted to the sleeve will be transmitted directly to the said shaft. A curved bracket or support 21 is secured upon the upper side of the cross bar 16 concentrically with the distributer shaft and a lever or adjusting arm 22 which is pivoted to the sleeve 19 rests upon and is movable over the said bracket. On the upper edge of said bracket are a plurality of lugs or teeth 23 against which the said adjusting arm or lever may bear so that the distributer shaft will be held in any position in which it may be set and will be prevented from dropping from said position through its own weight and the weight of the distributer carried thereby.

The lower portion of the distributer shaft is journaled in a cross bar 24 which is secured within the hopper 10 and extends diametrically across the same, the shaft extending through the open lower end of the hopper and carrying the distributer 25. The said distributer consists of a circular plate or disk which projects beyond the hopper and upon the upper surface of said disk or plate, between the hopper and the edge of the plate, are distributing blades 26 which are disposed radially and are preferably provided with concave faces 27 which are directed toward the material in the hopper and designed to act upon the same as it emerges from the hopper and throw it centrifugally therefrom. The plate or disk 25 is reinforced at its center by a disk 28 having a boss 29 on its under side at its center and the said boss is constructed with a diametric groove. The disk 28 is secured to the plate 25 by bolts 30 inserted therethrough, and a pin 31 inserted through the groove in the boss 29 and through a suitable opening in the lower end of the distributer shaft serves to secure the distributer to said shaft. It is obvious that if the pin be driven out the distributer can be withdrawn from the shaft so that repairs can be made very readily, or broken parts renewed.

Surrounding the lower portion of the distributer shaft within the hopper is a conical deflector 32 which is provided near its upper end with longitudinal slots 33, and securing straps or brackets 34 have their lower ends inserted through the said slots and bent to fit against the inner surface of the conical deflector and be secured thereto. The upper ends of the said straps or brackets are secured to the under side of the cross bar 24, as clearly shown in Fig. 3. By this arrangement the straps will effectually and rigidly support the deflector but will not offer any perceptible obstruction to the agitation and flow of the seed or fertilizer within the hopper, the outer surface of the deflector being practically uninterrupted.

A pair of scrapers 35 and 36 are provided and these scrapers have threaded shanks 37 which extend through the plate 25 and the disk 28 and are equipped at their lower extremities with nuts which may be turned home against the disk 28 whereby to secure the scrapers in position and also secure the disk to the circular plate, it being understood that the scrapers are expanded relatively to their shanks and thereby furnish stops or shoulders against which the circular plate may be clamped. The scraper 35 is bent so as to ride on the surface of the deflector 32 and thereby remove from the same any material that may tend to adhere thereto while the scraper 36 is so bent as to ride upon the inner surface of the hopper and perform the like office for the same.

The hopper is supported from the end gate 4 by brackets or supporting arms 38 rigidly secured to the end gate and to the hopper at the upper end of the same and by lower suspending arms or brackets 39 which are likewise secured rigidly to the end gate at their forward ends and at their rear ends are rigidly secured to the lower portion of the hopper.

It is thought the operation and advantages of my improved distributer will be readily understood and appreciated from the foregoing description taken in connection with the accompanying drawings. When it is desired to distribute seed or fertilizer, the end gate usually employed in the wagon is removed and the end gate 4 substituted for the same thereby supporting the distributer at the center of the rear end of the wagon. The chain 6 is trained around the sprocket wheel 5 and pinion 7 and a portion of the seed or fertilizer placed in the hopper. The wagon loaded with the material to be distributed is then driven over the field and motion will be imparted to the driving shaft through the described gearing so as to rotate said shaft and cause the material falling upon the distributing plate 25 to be thrown from the distributer so that it will fall to the ground and be spread over the same. As the material is discharged from the hopper it is replenished by a workman in the wagon loading additional material into the hopper and it will be readily noted that the operating gearing is all inclosed so that the seed or fertilizer cannot collect thereon and clog its action. It will also be noted that the deflector 32 is stationary and serves to deflect the material toward the sides of the hopper so that the material will not flow to the distributing plate in such quantities that it will tend to choke the mouth of the hopper or impose such a weight upon the distributing disk as to subject the operating gearing to a heavy strain. The rapidity of flow and distribution may be readily controlled by moving the adjusting arm or lever 22 so that the sleeve 29 will be rotated about the distributing shaft, this rotation of the said sleeve obviously causing its lower end to ride up or down upon the inclined upper end of the pedestal 17. As the sleeve moves upwardly an upward movement will be imparted to the collar 20 and through the same to the distributing shaft so that the distributing plate will be held close to the lower end of the hopper and the seed or fertilizer consequently distributed in a small quantity and slowly. If the sleeve 19 be rotated so as to move downwardly the distributing plate will, of course, be lowered through its own weight and the weight of the distributing shaft, and the distributing shaft has a splined or feathered connection with the pinion 12 so that it may move through the hub of said pinion without causing vertical movement of the pinion and without losing its operative connection therewith. The adjusting arm or lever 22 is forked at its inner end, as shown at 40, and this forked inner end is pivotally connected to the sleeve 19 so that the arm or lever may be readily moved to clear the holding teeth or lugs 23 on the supporting rack or bracket 21. It will be readily understood that the weight of the distributer tends to move the sleeve downwardly and this downward movement of the sleeve tends, of course, to rotate the same through the coaction of the beveled ends of the sleeve and the pedestal. Consequently, if the lever or adjusting arm be resting against one of the teeth or lugs 23 the downward movement of the sleeve and the distributer will be arrested and the distributer will be held in the position in which it is set.

Having thus described the invention, what is claimed as new is:

1. An apparatus for the purpose set forth comprising an end gate, brackets secured to and extending rearwardly from the end gate, a hopper rigidly supported by some of said brackets, a distributer disposed at the lower end of the hopper, a distributer shaft carrying said distributer and rising through the hopper, a driving shaft journaled in one of the said brackets and operatively connected with the distributer shaft within the hopper, and means for operatively connecting said driving shaft with a vehicle wheel.

2. In an apparatus for the purpose set forth, the combination of a hopper, a distributing plate disposed below the lower end of the hopper, a distributer shaft supporting said plate and extending upwardly through the hopper, means for rotating said shaft, and a conical deflector arranged around the lower portion of the distributer shaft and having a fixed support within the hopper.

3. In an apparatus for the purpose set forth, the combination of a hopper, a cross bar within the same, a distributing plate disposed below the hopper, a distributing shaft carrying said plate and extending up through the hopper and journaled in said cross-bar, means for rotating said shaft, a conical deflector disposed around the lower portion of the shaft and having longitudinal slots in its upper portion, and brackets secured at their upper ends to said cross-bar and having their lower portions extending through the slots in the deflector and rigidly secured to the inner side of the deflector.

4. In an apparatus for the purpose set forth, the combination of a hopper, a conical deflector rigidly secured within the hopper at the lower end thereof, a distributer plate arranged below the hopper, a distributer shaft carrying the distributer plate and extending upwardly through the hopper, means for rotating said shaft, and scrapers carried by the distributer plate, one of said scrapers riding upon the deflector and another of said scrapers riding upon the inner surface of the hopper.

5. In an apparatus for the purpose set forth, the combination of a hopper, a distributing plate below the hopper, a conical deflector within the hopper, a reinforcing disk secured against the under side of the distributing plate at the center of the same and having a diametric groove, a distributer shaft extending through the hopper concentrically with said deflector and passing through the distributing plate and the said disk at the centers of the same, a pin inserted through the groove in the said disk and through the distributer shaft, and means for rotating said shaft.

In testimony whereof I affix my signature.

MICAJAH C. PLUMMER. [L. S.]